(12) United States Patent
Sripada

(10) Patent No.: US 10,860,810 B2
(45) Date of Patent: *Dec. 8, 2020

(54) METHOD AND APPARATUS FOR MOTION DESCRIPTION

(71) Applicant: Arria Data2Text Limited, Aberdeen (GB)

(72) Inventor: Gowri Sripada, Westhill (GB)

(73) Assignee: Arria Data2Text Limited, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,453

(22) Filed: Apr. 30, 2018

(65) Prior Publication Data

US 2018/0349361 A1 Dec. 6, 2018

Related U.S. Application Data

(63) Continuation of application No. 14/650,777, filed as application No. PCT/IB2012/057774 on Dec. 27, 2012, now Pat. No. 9,990,360.

(51) Int. Cl.
    *G06F 40/30* (2020.01)
    *G06F 40/56* (2020.01)

(52) U.S. Cl.
    CPC .................. *G06F 40/56* (2020.01)

(58) Field of Classification Search
    CPC ...... G06F 17/27; G06F 17/20; G06F 17/2705; G06F 17/271; G06F 17/2715;
    (Continued)

(56) References Cited

U.S. PATENT DOCUMENTS 5,181,250 A  1/1993  Morgan et al.
5,237,502 A  8/1993  White et al.
(Continued)

FOREIGN PATENT DOCUMENTS

AU  2011247830 B2  12/2011
AU  2011253627 B2  12/2011
(Continued)

OTHER PUBLICATIONS

Alawneh et al., "Pattern Recognition Techniques Applied to the Abstraction of Traces of Inter-Process Communication," Software Maintenance and Reengineering (CSMR), 2011 15th European Conference on Year: 2011, IEEE Conference Publications, pp. 211-220, (2.
(Continued)

*Primary Examiner* — Lamont M Spooner
(74) *Attorney, Agent, or Firm* — Alston & Bird LLP

(57) ABSTRACT

A method, apparatus, and computer program product for describing motion. The method may include receiving a set of eventualities (114). The set of eventualities (114) may describe at least one of a domain event and a domain state. The at least one of the domain event and the domain state may be derived from a set of spatio-temporal data (102) and the set of eventualities (114) may be associated with a particular region and a particular time period. The method may include organizing the set of eventualities to generate a document plan. The method may further include generating, using a processor, a linguistic representation of the set of eventualities using the document plan.

19 Claims, 6 Drawing Sheets

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795; G06F 17/30241; G06F 17/3087; G06F 40/211; G06F 40/253; G06F 40/268; G06F 40/284; G06F 40/30; G06F 3/017; G06F 3/00; G06F 16/2477
USPC .......................... 704/1, 9, 10; 707/706–708
See application file for complete search history.

(56) References Cited

U.S. PATENT DOCUMENTS

| | | | |
|---|---|---|---|
| 5,311,429 | A | 5/1994 | Tominaga |
| 5,321,608 | A | 6/1994 | Namba et al. |
| 5,629,687 | A | 5/1997 | Sutton et al. |
| 5,794,177 | A | 8/1998 | Carus et al. |
| 5,802,488 | A | 9/1998 | Edatsune |
| 6,023,669 | A | 2/2000 | Suda et al. |
| 6,078,914 | A | 6/2000 | Redfern |
| 6,138,087 | A | 10/2000 | Budzinski |
| 6,266,617 | B1 | 7/2001 | Evans |
| 6,424,370 | B1* | 7/2002 | Courtney ........... G06K 9/00342 348/143 |
| 6,442,485 | B2 | 8/2002 | Evans |
| 6,466,899 | B1 | 10/2002 | Yano et al. |
| 6,665,640 | B1 | 12/2003 | Bennett et al. |
| 6,717,513 | B1 | 4/2004 | Sandelman et al. |
| 6,947,885 | B2 | 9/2005 | Bangalore et al. |
| 7,043,420 | B2 | 5/2006 | Ratnaparkhi |
| 7,117,199 | B2* | 10/2006 | Frank ................... G06F 16/954 |
| 7,167,824 | B2 | 1/2007 | Kallulli |
| 7,231,341 | B2 | 6/2007 | Bangalore et al. |
| 7,238,313 | B2 | 7/2007 | Ferencz et al. |
| 7,269,516 | B2* | 9/2007 | Brunner ................ A01K 1/031 702/19 |
| 7,305,336 | B2 | 12/2007 | Polanyi et al. |
| 7,310,969 | B2 | 12/2007 | Dale |
| 7,346,493 | B2 | 3/2008 | Ringger et al. |
| 7,418,447 | B2 | 8/2008 | Caldwell et al. |
| 7,424,363 | B2 | 9/2008 | Cheng et al. |
| 7,444,287 | B2 | 10/2008 | Claudatos et al. |
| 7,496,621 | B2 | 2/2009 | Pan et al. |
| 7,526,424 | B2 | 4/2009 | Corston-Oliver et al. |
| 7,533,089 | B2 | 5/2009 | Pan et al. |
| 7,542,934 | B2 | 6/2009 | Markel |
| 7,562,005 | B1 | 7/2009 | Bangalore et al. |
| 7,599,988 | B2* | 10/2009 | Frank ................... G06F 16/9537 709/203 |
| 7,684,991 | B2 | 3/2010 | Stohr et al. |
| 7,711,581 | B2 | 5/2010 | Hood et al. |
| 7,783,486 | B2 | 8/2010 | Rosser et al. |
| 7,809,552 | B2 | 10/2010 | Pan et al. |
| 7,849,048 | B2 | 12/2010 | Langseth et al. |
| 7,849,049 | B2 | 12/2010 | Langseth et al. |
| 7,856,390 | B2 | 12/2010 | Schiller |
| 7,873,509 | B1 | 1/2011 | Budzinski |
| 7,921,091 | B2 | 4/2011 | Cox et al. |
| 7,930,169 | B2 | 4/2011 | Billerey-Mosier |
| 7,933,774 | B1 | 4/2011 | Begeja et al. |
| 7,966,172 | B2 | 6/2011 | Ruiz et al. |
| 7,970,601 | B2 | 6/2011 | Burmester et al. |
| 7,979,267 | B2 | 7/2011 | Ruiz et al. |
| 8,015,183 | B2* | 9/2011 | Frank ..................... G06F 16/38 707/724 |
| 8,019,610 | B2 | 9/2011 | Walker et al. |
| 8,024,331 | B2 | 9/2011 | Calistri-Yeh et al. |
| 8,037,000 | B2 | 10/2011 | Delmonico et al. |
| 8,082,144 | B1 | 12/2011 | Brown et al. |
| 8,090,727 | B2 | 1/2012 | Lachtarnik et al. |
| 8,150,676 | B1 | 4/2012 | Kaeser |
| 8,175,873 | B2 | 5/2012 | Di Fabbrizio et al. |
| 8,180,647 | B2 | 5/2012 | Walker et al. |
| 8,180,758 | B1 | 5/2012 | Cornali |
| 8,200,676 | B2* | 6/2012 | Frank .................. G06F 16/9537 707/749 |
| 8,229,937 | B2 | 7/2012 | Kiefer et al. |
| 8,335,786 | B2 | 12/2012 | Pereira et al. |
| 8,345,984 | B2 | 1/2013 | Ji et al. |
| 8,355,903 | B1 | 1/2013 | Birnbaum et al. |
| 8,374,848 | B1 | 2/2013 | Birnbaum et al. |
| 8,425,325 | B2 | 4/2013 | Hope |
| 8,473,911 | B1 | 6/2013 | Baxter |
| 8,494,944 | B2 | 7/2013 | Schiller |
| 8,515,733 | B2 | 8/2013 | Jansen |
| 8,515,737 | B2 | 8/2013 | Allen |
| 8,548,814 | B2 | 10/2013 | Manuel-Devadoss |
| 8,548,915 | B2 | 10/2013 | Antebi et al. |
| 8,561,014 | B2 | 10/2013 | Mengusoglu et al. |
| 8,566,090 | B2 | 10/2013 | Di Fabbrizio et al. |
| 8,589,148 | B2 | 11/2013 | Atallah et al. |
| 8,589,172 | B2 | 11/2013 | Alonso et al. |
| 8,616,896 | B2 | 12/2013 | Lennox |
| 8,620,669 | B2 | 12/2013 | Walker et al. |
| 8,626,613 | B2 | 1/2014 | Dale et al. |
| 8,630,844 | B1 | 1/2014 | Nichols et al. |
| 8,645,291 | B2* | 2/2014 | Hawkins ............... G06F 9/3867 706/12 |
| 8,655,889 | B2 | 2/2014 | Hua et al. |
| 8,676,691 | B2 | 3/2014 | Schiller |
| 8,688,434 | B1 | 4/2014 | Birnbaum et al. |
| 8,700,396 | B1 | 4/2014 | Mengibar et al. |
| 8,738,384 | B1 | 5/2014 | Bansal et al. |
| 8,738,558 | B2 | 5/2014 | Antebi et al. |
| 8,762,134 | B2 | 5/2014 | Reiter |
| 8,762,133 | B2 | 6/2014 | Reiter |
| 8,775,161 | B1 | 7/2014 | Nichols et al. |
| 8,825,533 | B2 | 9/2014 | Basson et al. |
| 8,843,363 | B2 | 9/2014 | Birnbaum et al. |
| 8,849,670 | B2 | 9/2014 | Di Cristo et al. |
| 8,874,584 | B1* | 10/2014 | Chen .................... G06F 16/786 707/741 |
| 8,886,520 | B1 | 11/2014 | Nichols et al. |
| 8,892,417 | B1 | 11/2014 | Nichols et al. |
| 8,892,419 | B2 | 11/2014 | Lundberg et al. |
| 8,898,063 | B1 | 11/2014 | Sykes et al. |
| 8,903,711 | B2 | 12/2014 | Lundberg et al. |
| 8,903,718 | B2 | 12/2014 | Akuwudike |
| 8,909,595 | B2 | 12/2014 | Gandy et al. |
| 8,914,452 | B2 | 12/2014 | Boston et al. |
| 8,924,330 | B2 | 12/2014 | Antebi et al. |
| 8,930,305 | B2 | 1/2015 | Namburu et al. |
| 8,977,953 | B1 | 3/2015 | Pierre et al. |
| 8,984,051 | B2 | 3/2015 | Olsen et al. |
| 9,002,695 | B2 | 4/2015 | Watanabe et al. |
| 9,002,869 | B2 | 4/2015 | Riezler et al. |
| 9,015,730 | B1 | 4/2015 | Allen et al. |
| 9,028,260 | B2 | 5/2015 | Nanjiani et al. |
| 9,092,276 | B2 | 7/2015 | Allen et al. |
| 9,104,720 | B2 | 8/2015 | Rakshit et al. |
| 9,110,882 | B2 | 8/2015 | Overell et al. |
| 9,110,977 | B1 | 8/2015 | Pierre et al. |
| 9,111,534 | B1 | 8/2015 | Sylvester et al. |
| 9,135,244 | B2 | 9/2015 | Reiter |
| 9,135,662 | B2 | 9/2015 | Evenhouse et al. |
| 9,146,904 | B2 | 9/2015 | Allen |
| 9,164,982 | B1 | 10/2015 | Kaeser |
| 9,190,054 | B1 | 11/2015 | Riley et al. |
| 9,198,621 | B2 | 12/2015 | Fernstrom et al. |
| 9,208,147 | B1 | 12/2015 | Nichols et al. |
| 9,229,927 | B2 | 1/2016 | Wolfram et al. |
| 9,240,197 | B2 | 1/2016 | Begeja et al. |
| 9,244,894 | B1 | 1/2016 | Dale et al. |
| 9,251,134 | B2 | 2/2016 | Birnbaum et al. |
| 9,251,143 | B2 | 2/2016 | Bird et al. |
| 9,263,039 | B2 | 2/2016 | Di Cristo et al. |
| 9,268,770 | B1 | 2/2016 | Ikursun |
| 9,318,108 | B2* | 4/2016 | Gruber ................... G10L 15/22 |
| 9,323,743 | B2 | 4/2016 | Reiter |
| 9,405,448 | B2 | 8/2016 | Reiter |
| 9,548,050 | B2* | 1/2017 | Gruber ................... G10L 15/22 |
| 9,600,471 | B2 | 3/2017 | Bradshaw et al. |

(56) References Cited

U.S. PATENT DOCUMENTS

| | | | |
|---|---|---|---|
| 9,640,045 B2 | 5/2017 | Reiter | |
| 9,990,360 B2 | 6/2018 | Sripada | |
| 10,026,274 B2 | 7/2018 | Reiter | |
| 10,115,202 B2 | 10/2018 | Sripada | |
| 2002/0026306 A1 | 2/2002 | Bangalore et al. | |
| 2003/0131315 A1 | 7/2003 | Escher | |
| 2003/0212545 A1 | 11/2003 | Kallulli | |
| 2004/0141654 A1 | 7/2004 | Jeng | |
| 2004/0186723 A1* | 9/2004 | Mizutani | G06F 3/14 704/270.1 |
| 2004/0246120 A1 | 12/2004 | Benner et al. | |
| 2005/0039107 A1 | 2/2005 | Hander et al. | |
| 2005/0203927 A1* | 9/2005 | Sull | G11B 27/034 |
| 2005/0228635 A1 | 10/2005 | Araki et al. | |
| 2005/0256703 A1 | 11/2005 | Markel | |
| 2005/0289183 A1* | 12/2005 | Kaneko | G11B 27/034 |
| 2006/0085667 A1 | 4/2006 | Kubota et al. | |
| 2006/0178868 A1 | 8/2006 | Billerey-Mosier | |
| 2006/0200253 A1* | 9/2006 | Hoffberg | G05B 15/02 700/19 |
| 2006/0259293 A1 | 11/2006 | Orwant | |
| 2007/0078655 A1 | 4/2007 | Semkow et al. | |
| 2007/0106628 A1 | 5/2007 | Adjali et al. | |
| 2007/0112511 A1* | 5/2007 | Burfeind | G08G 5/0013 701/469 |
| 2007/0129942 A1 | 6/2007 | Ban et al. | |
| 2007/0143099 A1 | 6/2007 | Balchandran et al. | |
| 2008/0221865 A1 | 9/2008 | Wellmann | |
| 2008/0221870 A1 | 9/2008 | Attardi et al. | |
| 2008/0281781 A1 | 11/2008 | Zhao et al. | |
| 2008/0312954 A1 | 12/2008 | Ullrich et al. | |
| 2009/0089100 A1 | 4/2009 | Nenov et al. | |
| 2009/0089126 A1 | 4/2009 | Odubiyi | |
| 2009/0111486 A1 | 4/2009 | Burstrom | |
| 2009/0156229 A1 | 6/2009 | Hein et al. | |
| 2009/0198496 A1 | 8/2009 | Denecke | |
| 2009/0222482 A1* | 9/2009 | Klassen | G06F 16/487 |
| 2009/0281839 A1 | 11/2009 | Lynn et al. | |
| 2009/0286514 A1 | 11/2009 | Lichorowic et al. | |
| 2009/0287567 A1 | 11/2009 | Penberthy et al. | |
| 2010/0146491 A1 | 6/2010 | Hirano et al. | |
| 2010/0153095 A1 | 6/2010 | Yang et al. | |
| 2010/0153321 A1* | 6/2010 | Savvides | G06F 17/271 706/13 |
| 2010/0174545 A1 | 7/2010 | Otani | |
| 2010/0191658 A1 | 7/2010 | Kannan et al. | |
| 2010/0203970 A1 | 8/2010 | Hope | |
| 2010/0281440 A1* | 11/2010 | Underkoffler | G06F 3/017 715/863 |
| 2010/0332235 A1 | 12/2010 | David | |
| 2011/0010164 A1 | 1/2011 | Williams | |
| 2011/0040760 A1* | 2/2011 | Fleischman | G06Q 30/02 707/737 |
| 2011/0068929 A1 | 3/2011 | Franz et al. | |
| 2011/0087486 A1 | 4/2011 | Schiller | |
| 2011/0160986 A1 | 6/2011 | Wu et al. | |
| 2011/0179006 A1 | 7/2011 | Cox et al. | |
| 2011/0182469 A1 | 7/2011 | Ji et al. | |
| 2011/0218822 A1 | 9/2011 | Buisman et al. | |
| 2011/0225185 A1 | 9/2011 | Gupta | |
| 2011/0257839 A1 | 10/2011 | Mukherjee | |
| 2012/0078888 A1 | 3/2012 | Brown et al. | |
| 2012/0084027 A1 | 4/2012 | Caine | |
| 2012/0131008 A1 | 5/2012 | Ahn et al. | |
| 2012/0136649 A1 | 5/2012 | Freising et al. | |
| 2012/0158089 A1 | 6/2012 | Bocek et al. | |
| 2012/0173475 A1 | 7/2012 | Ash et al. | |
| 2012/0215893 A1* | 8/2012 | Bisdikian | G06F 9/5011 709/223 |
| 2012/0265764 A1* | 10/2012 | Agrawal | G06F 16/14 707/746 |
| 2012/0290289 A1 | 11/2012 | Manera et al. | |
| 2012/0310990 A1 | 12/2012 | Viegas et al. | |
| 2013/0030810 A1 | 1/2013 | Kopparapu et al. | |
| 2013/0066873 A1 | 3/2013 | Salvetti et al. | |
| 2013/0129307 A1* | 5/2013 | Choe | H04N 5/2621 386/227 |
| 2013/0144606 A1 | 6/2013 | Birnbaum et al. | |
| 2013/0145242 A1 | 6/2013 | Birnbaum et al. | |
| 2013/0151238 A1 | 6/2013 | Beaurpere et al. | |
| 2013/0174026 A1 | 7/2013 | Locke | |
| 2013/0185050 A1 | 7/2013 | Bird et al. | |
| 2013/0211855 A1 | 8/2013 | Eberle et al. | |
| 2013/0238329 A1 | 9/2013 | Casella dos Santos | |
| 2013/0238330 A1 | 9/2013 | Casella dos Santos | |
| 2013/0238987 A1 | 9/2013 | Lutwyche | |
| 2013/0251233 A1 | 9/2013 | Yang et al. | |
| 2013/0268263 A1 | 10/2013 | Park et al. | |
| 2013/0293363 A1 | 11/2013 | Plymouth et al. | |
| 2013/0297293 A1 | 11/2013 | Di Cristo et al. | |
| 2013/0311201 A1 | 11/2013 | Chatfield et al. | |
| 2014/0019531 A1 | 1/2014 | Czajka et al. | |
| 2014/0025371 A1 | 1/2014 | Min | |
| 2014/0039878 A1 | 2/2014 | Wasson | |
| 2014/0052696 A1 | 2/2014 | Soroushian | |
| 2014/0062712 A1 | 3/2014 | Reiter | |
| 2014/0067377 A1 | 3/2014 | Reiter | |
| 2014/0072947 A1 | 3/2014 | Boguraev et al. | |
| 2014/0072948 A1 | 3/2014 | Boguraev et al. | |
| 2014/0089212 A1 | 3/2014 | Sbodio | |
| 2014/0100846 A1 | 4/2014 | Haine et al. | |
| 2014/0100901 A1 | 4/2014 | Haine et al. | |
| 2014/0100923 A1 | 4/2014 | Strezo et al. | |
| 2014/0143720 A1 | 5/2014 | Dimarco et al. | |
| 2014/0149107 A1 | 5/2014 | Schilder | |
| 2014/0164303 A1 | 6/2014 | Bagchi et al. | |
| 2014/0164304 A1 | 6/2014 | Bagchi et al. | |
| 2014/0188477 A1 | 7/2014 | Zhang | |
| 2014/0201126 A1 | 7/2014 | Zadeh et al. | |
| 2014/0278358 A1 | 9/2014 | Byron et al. | |
| 2014/0281935 A1 | 9/2014 | Byron et al. | |
| 2014/0281951 A1 | 9/2014 | Megiddo et al. | |
| 2014/0297268 A1 | 10/2014 | Govrin et al. | |
| 2014/0300684 A1* | 10/2014 | Fagadar-Cosma | G06F 3/017 348/14.03 |
| 2014/0316768 A1 | 10/2014 | Khandekar | |
| 2014/0375466 A1 | 12/2014 | Reiter | |
| 2014/0379322 A1 | 12/2014 | Koutrika et al. | |
| 2014/0379378 A1 | 12/2014 | Cohen-Solal et al. | |
| 2015/0006437 A1 | 1/2015 | Byron et al. | |
| 2015/0032443 A1 | 1/2015 | Karov et al. | |
| 2015/0081299 A1 | 3/2015 | Jasinschi et al. | |
| 2015/0081307 A1 | 3/2015 | Cederstrom et al. | |
| 2015/0081321 A1 | 3/2015 | Jain | |
| 2015/0095015 A1 | 4/2015 | Lani et al. | |
| 2015/0106307 A1 | 4/2015 | Antebi et al. | |
| 2015/0142418 A1 | 5/2015 | Byron et al. | |
| 2015/0142421 A1 | 5/2015 | Buurman et al. | |
| 2015/0154359 A1 | 6/2015 | Harris et al. | |
| 2015/0163358 A1 | 6/2015 | Klemm et al. | |
| 2015/0169522 A1 | 6/2015 | Logan et al. | |
| 2015/0169548 A1 | 6/2015 | Reiter | |
| 2015/0169659 A1 | 6/2015 | Lee et al. | |
| 2015/0169720 A1 | 6/2015 | Byron et al. | |
| 2015/0169737 A1 | 6/2015 | Byron et al. | |
| 2015/0179082 A1 | 6/2015 | Byron et al. | |
| 2015/0227508 A1 | 8/2015 | Howald et al. | |
| 2015/0235000 A1 | 8/2015 | Akushevich et al. | |
| 2015/0242384 A1 | 8/2015 | Reiter | |
| 2015/0261744 A1 | 9/2015 | Suenbuel et al. | |
| 2015/0261836 A1 | 9/2015 | Madhani et al. | |
| 2015/0279348 A1 | 10/2015 | Cao et al. | |
| 2015/0310013 A1 | 10/2015 | Allen et al. | |
| 2015/0310112 A1 | 10/2015 | Allen et al. | |
| 2015/0310861 A1 | 10/2015 | Waltermann et al. | |
| 2015/0324343 A1 | 11/2015 | Carter et al. | |
| 2015/0324351 A1 | 11/2015 | Sripada et al. | |
| 2015/0324374 A1 | 11/2015 | Sripada et al. | |
| 2015/0324413 A1 | 11/2015 | Gubin et al. | |
| 2015/0326622 A1 | 11/2015 | Carter et al. | |
| 2015/0331845 A1 | 11/2015 | Guggilla et al. | |
| 2015/0331846 A1 | 11/2015 | Guggilla et al. | |
| 2015/0332670 A1 | 11/2015 | Akbacak et al. | |

(56) References Cited

U.S. PATENT DOCUMENTS

| | | |
|---|---|---|
| 2015/0356127 A1 | 12/2015 | Pierre et al. |
| 2015/0363363 A1 | 12/2015 | Bohra et al. |
| 2015/0363364 A1 | 12/2015 | Sripada |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2016/0019200 A1 | 1/2016 | Allen |
| 2016/0027125 A1 | 1/2016 | Bryce |
| 2016/0055150 A1 | 2/2016 | Bird et al. |
| 2016/0132489 A1 | 5/2016 | Reiter |
| 2016/0140090 A1 | 5/2016 | Dale et al. |
| 2016/0328385 A1 | 11/2016 | Reiter |
| 2017/0018107 A1 | 1/2017 | Reiter |
| 2019/0035232 A1 | 1/2019 | Reiter |
| 2019/0197697 A1 | 6/2019 | Sripada |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1336955 B1 | 5/2006 |
| EP | 2707809 A1 | 3/2014 |
| EP | 2750759 A1 | 7/2014 |
| EP | 2849103 A2 | 3/2015 |
| GB | 2518192 A | 3/2015 |
| JP | 61-221873 A | 10/1986 |
| JP | 2004-21791 A | 1/2004 |
| JP | 2014165766 A | 9/2014 |
| WO | WO 2000/074394 A2 | 12/2000 |
| WO | WO 2002/031628 A2 | 4/2002 |
| WO | WO 2002/073449 A1 | 9/2002 |
| WO | WO 2002/073531 A1 | 9/2002 |
| WO | WO 2002/031628 A3 | 10/2002 |
| WO | WO 2006/010044 A2 | 1/2006 |
| WO | WO 2007/041221 A1 | 4/2007 |
| WO | WO 2009/014465 A2 | 1/2009 |
| WO | WO 2010/049925 A2 | 5/2010 |
| WO | WO 2010/051404 A1 | 5/2010 |
| WO | WO 2012/071571 A2 | 5/2012 |
| WO | WO 2013/009613 A1 | 1/2013 |
| WO | WO 2013/042115 A2 | 3/2013 |
| WO | WO 2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/102568 A1 | 7/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/159133 A1 | 10/2015 |
| WO | WO 2015/164253 A1 | 10/2015 |
| WO | WO 2015/175338 A1 | 11/2015 |
| WO | WO 2016/004266 A2 | 1/2016 |

OTHER PUBLICATIONS

Andre et al., "From Visual Data to Multimedia Presentations," Grounding Representations: Integration of Sensory Information in Natural Language Processing, Artificial Intelligence and Neural networks, IEE Colloquium On, pp. 1-3, (1995).

Andre et al., "Natural Language Access to Visual Data: Dealing with Space and Movement," Report 63, German Research Center for Artificial Intelligence (DFKI) SFB 314, Project VITRA, pp. 1-21, (1989).

Barzilay et al.; "Aggregation via Set Partitioning for Natural Language Generation", Proceedings of the Human Language Technology Conference of the North American Chapter of the ACL; pp. 359-366; (2006).

Bhoedjang et al., "Optimizing Distributed Data Structures Using Application-Specific Network Interface Software," Parallel Processing, Proceedings; International Conference on Year: 1998, IEEE Conference Publications, pp. 485-492, (1998).

Cappozzo et al., "Surface-Marker Cluster Design Criteria for 3-D Bone Movement Reconstruction," IEEE Transactions on Biomedical Engineering, 44(12):1165-1174, (1997).

Dalianis et al.; "Aggregation in Natural Language Generation;" Trends in Natural Language Generation, an Artificial Intelligence Perspective; pp. 88-105; (1993).

Dragon et al., "Multi-Scale Clustering of Frame-to-Frame Correspondences for Motion Segmentation," Computer Vision ECCV, Springer Berlin Heidelberg, pp. 445-458, (2012).

Gatt et al.,"From Data to Text in the Neonatal Intensive Care Unit: Using NLG Technology for Decision Support and Information Management," AI Communication, pp. 153-186, (2009).

Gorelov et al., "Search Optimization in Semistructured Databases Using Hierarchy of Document Schemas," Programming and Computer Software, 31(6):321-331, (2005).

Herzog et al., "Combining Alternatives in the Multimedia Presentation of Decision Support Information for Real-Time Control," IFIP, 15 pages,(1998).

Kojima et al., "Generating Natural Language Description of Human Behavior from Video Images," IEEE, pp. 728-731, (2000).

Kottke et al., "Motion Estimation Via Cluster Matching," 8180 IEEE Transactions on Pattern Analysis and Machine Intelligence, 16(11):1128-1132, (1994).

Kukich, "Knowledge-Based Report Generation: A Knowledge-Engineering Approach to Natural Language Report Generation," Dissertation to The Interdisciplinary Department of Information Science, University of Pittsburg, 260 pages, (1983).

Leonov et al., "Construction of an Optimal Relational Schema for Storing XML Documents in an RDBMS Without Using DTD/XML Schema," Programming and Computer Software, 30(6):323-336, (2004).

Perry et al., "Automatic Realignment of Data Structures to Improve MPI Performance," Networks (ICN), Ninth International Conference on Year: 2010, IEEE Conference Publications, pp. 42-47, (2010).

Quinlan, "Induction of Decision Trees," Machine Learning, Kluwer Academic Publishers, 1(1):81-106, (1986).

Radev et al.,"Generating Natural Language Summaries from Multiple On-Line Sources," Association of Computational Linguistics, 24(3):469-500, (1998).

Reiter et al., "Building Applied Natural Language Generation Systems," Natural Language Engineering 1 (1), 31 pages, (1995).

Reiter et al.; "Studies in Natural Language Processing—Building Natural Language Generation Systems," Cambridge University Press, (2000).

Reiter, "An Architecture for Data-to-Text Systems," Proceedings of ENLG-2007, pp. 97-104, (2007).

Shaw, "Clause Aggregation Using Linguistic Knowledge;" Proceedings of IWNLG, pp. 138-147, (1998). Retrieved from <http://acl.ldc.upenn.edu/W/W98/W98-1415.pdf>.

Spillner et al., "Algorithms for Dispersed Processing," Utility and Cloud Computing (UC), 204 IEEE/ACM 7th International Conference on Year: 2014, IEEE Conferenced Publications, pp. 914-921, (2014).

Voelz et al., "Rocco: A RoboCup Soccer Commentator System," German Research Center for Artificial Intelligence DFKI GmbH, 11 pages, (1999).

Yu et al., "Choosing the Content of Textual Summaries of Large Time-Series Data Sets," Natural Language Engineering, 13:1-28, (2007).

International Preliminary Report on Patentability for Application No. PCT/IB2012/056513 dated May 19, 2015.

International Preliminary Report on Patentability for Application No. PCT/IB2012/056514 dated May 19, 2015.

International Preliminary Report on Patentability for Application No. PCT/IB2012/057773 dated Jun. 30, 2015.

(56) References Cited

OTHER PUBLICATIONS

International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.
International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2012/056513 dated Jun. 26, 2013.
International Search Report and Written Opinion for Application No. PCT/IB2012/056514 dated Jun. 26, 2013.
International Search Report and Written Opinion for Application No. PCT/162012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/IB2013/058131 dated Jul. 3, 2014.
International Search Report and Written Opinion for Application No. PCT/IB2014/060846 dated Feb. 4, 2015.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
Notice of Allowance for U.S. Appl. No. 14/023,023 dated Apr. 11, 2014.
Notice of Allowance for U.S. Appl. No. 14/023,056 dated Apr. 29, 2014.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Notice of Allowance for U.S. Appl. No. 14/650,763 dated Jan. 30, 2018.
Notice of Allowance for U.S. Appl. No. 14/650,763 dated Jun. 26, 2018.
Notice of Allowance for U.S. Appl. No. 14/650,777 dated Jan. 30, 2018.
Notice of Allowance for U.S. Appl. No. 15/421,921 dated Mar. 14, 2018.
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 14/650,763 dated Dec. 16, 2016.
Office Action for U.S. Appl. No. 14/650,763 dated Sep. 8, 2017.
Office Action for U.S. Appl. No. 14/650,777 dated Mar. 6, 2017.
Office Action for U.S. Appl. No. 14/650,777 dated Sep. 7, 2016.
Office Action for U.S. Appl. No. 15/074,425 dated Feb. 26, 2018.
Office Action for U.S. Appl. No. 15/074,425 dated May 10, 2017.
Office Action for U.S. Appl. No. 15/188,423 dated Jul. 20, 2018.
Office Action for U.S. Appl. No. 15/188,423 dated Oct. 23, 2017.
Office Action for U.S. Appl. No. 15/421,921 dated Sep. 27, 2017.
Statement in accordance with the Notice from the European patent Office dated Oct. 1, 2007 concerning business methods (OJ EPO Nov. 2007, 592-593, (XP002456414) 1 page.
U.S. Appl. No. 12/779,636; entitled "System and Method For Using Data To Automatically Generate A Narrative Story" filed May 13, 2010.
U.S. Appl. No. 13/186,308; entitled "Method and Apparatus For Triggering The Automatic Generation Of Narratives" filed Jul. 19, 2011.
U.S. Appl. No. 13/186,329; entitled "Method And Apparatus for Triggering The Automatic Generation of Narratives" filed Jul. 19, 2011.
U.S. Appl. No. 13/186,337; entitled "Method And Apparatus For Triggering The Automatic Generation Of Narratives" filed Jul. 19, 2011.
U.S. Appl. No. 13/186,346; entitled "Method and Apparatus For Triggering The Automatic Generation Of Narratives" filed Jul. 19, 2011.
U.S. Appl. No. 13/464,635; entitled "Use Of Tools And Abstraction In A Configurable And Portable System For Generating Narratives" filed May 4, 2012.
U.S. Appl. No. 13/464,675; entitled "Configurable And Portable System For Generating Narratives" filed May 4, 2012.
U.S. Appl. No. 13/464,716; entitled "Configurable And Portable System For Generating Narratives" filed May 4, 2012.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684; entitled "Method, Apparatus, And Computer Program Product For User-Directed Reporting;" filed Sep. 16, 2013.
U.S. Appl. No. 14/027,775; entitled "Method and Apparatus For Interactive Reports;" filed Sep. 16, 2013.
U.S. Appl. No. 14/311,806; entitled Method and Apparatus for Alert Validation; In re: Reiter, filed Jun. 23, 2014.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/650,763; entitled "Method And Apparatus For Motion Detection;" filed Jun. 9, 2015.
U.S. Appl. No. 14/914,461, filed Feb. 25, 2016; In re: Reiter et al., entitled Text Generation From Correlated Alerts.
U.S. Appl. No. 15/022,420, filed Mar. 16, 2016; In re: Mahamood, entitled Method and Apparatus for Document Planning.
U.S. Appl. No. 15/074,425, filed Mar. 18, 2016; In re: Reiter, entitled Method and Apparatus for Situational Analysis Text Generation.
U.S. Appl. No. 15/093,337, filed Apr. 7, 2016; In re: Reiter, entitled Method and Apparatus for Referring Expression Generation.

(56) References Cited

OTHER PUBLICATIONS

U.S. Appl. No. 15/093,365, filed Apr. 7, 2016; In re: Logan et al., entitled Method and Apparatus for Updating a Previously Generated Text.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.
Notice of Allowance for U.S. Appl. No. 15/188,423 dated Dec. 28, 2018.
Notice of Allowance for U.S. Appl. No. 16/009,006 dated Jul. 31, 2019.
Office Action for U.S. Appl. No. 15/074,425 dated Nov. 27, 2018.
Office Action for U.S. Appl. No. 15/188,423 dated Oct. 30, 2018.
Office Action for U.S. Appl. No. 16/009,006 dated Dec. 3, 2018.
Office Action for U.S. Appl. No. 15/074,425 dated Oct. 4, 2019.
Office Action for U.S. Appl. No. 16/142,445 dated Oct. 3, 2019.
Notice of Allowance for U.S. Appl. No. 15/074,425 dated May 8, 2020.
Notice of Allowance for U.S. Appl. No. 16/142,445 dated Jun. 4, 2020.
Office Action for U.S. Appl. No. 16/367,095 dated May 28, 2020.

* cited by examiner

US 10,860,810 B2

METHOD AND APPARATUS FOR MOTION DESCRIPTION

The present application is a continuation of U.S. patent application Ser. No. 14/650,777, titled "METHOD AND APPARATUS FOR MOTION DESCRIPTION," filed Jun. 9, 2015, which is a national phase entry of International Application No. PCT/IB2012/057774, titled "METHOD AND APPARATUS FOR MOTION DESCRIPTION," filed Dec. 27, 2012, the contents of which are incorporated herein by reference in their entirety.

TECHNOLOGICAL FIELD

Embodiments of the present invention relate generally to natural language generation technologies and, more particularly, relate to a method, apparatus, and computer program product for motion description.

BACKGROUND

Advances in computer processor speeds and other performance characteristics have occurred at a rapid pace in recent history, to the point that many human behaviors can now be thoroughly mimicked by machines. However, it has become apparent that current technology is insufficient for replication of certain activities. For example, the human brain tends to be quite adept at extracting data and drawing inferences and conclusions from complex sets of data. These inferences and conclusions may be used to describe the data in a way that allows another human to easily understand important events that occur in the data set. One such task that employs these reasoning faculties is the use of language to describe events in a concise, natural manner.

In an effort to enable computers and other machines to communicate data in a similar manner to human beings, example embodiments of the invention relate to Natural Language Generation (NLG) systems. These NLG systems function to parse data sets and to identify features within the dataset for communication to users, customers, other computer systems, or the like by expressing the features in a linguistic format. In some examples, a NLG system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index. For example, "securities markets rose steadily through most of the morning, before sliding downhill late in the day."

Data that is input into a NLG system may be provided in, for example, a recurrent formal structure. The recurrent formal structure may comprise a plurality of individual fields and defined relationships among the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

In some examples, an NLG system may be configured to linguistically express a certain type of data. For example, the NLG system may be configured to describe sports statistics, financial data, weather data, or the like using terminology and linguistic expressions appropriate for the data set. Different terminology, phraseology, idioms, and the like may be used to describe different types of phenomena, and different data domains may require different analysis techniques for efficient generation of linguistic output. For example, an analysis operation for a set of sports data to generate a game recap may require different data analysis techniques than analysis of weather data to generate a weather forecast. One example of such input data may be presented as a set of eventualities associated with a set of static and moving objects. Current implementations do not provide a proper framework for using such eventualities to express the eventualities in a linguistic format.

BRIEF SUMMARY

Some example embodiments of an NLG system may relate to description of motion given a set of eventualities which describe objects and their motion in a given spatial region. For example, a NLG system may be employed to generate a weather forecast when provided with a set of eventualities that describe weather objects, such as areas of precipitation, wind direction, high and low pressure, and the like. These data features may be utilized by the NLG system in conjunction with weather forecast document models to generate the weather forecast in a natural, efficient, linguistically correct format suitable for user consumption.

Methods, apparatuses, and computer program products are described herein that are configured to describe motion. Embodiments may include a method for describing motion. The method may include receiving a set of eventualities. The set of eventualities may describe at least one of a domain event and a domain state. The at least one of the domain event and the domain state may be derived from a set of spatio-temporal data and the set of eventualities may be associated with a particular region and a particular time period. The method may further include organizing the set of eventualities to generate a document plan, and generating, using a processor, a linguistic representation of the set of eventualities using the document plan.

Embodiments may also include an apparatus for describing motion. The apparatus may include a memory coupled to at least one processor. The processor may be configured to receive a set of eventualities. The set of eventualities may describe at least one of a domain event and a domain state. The at least one of the domain event and the domain state may be derived from a set of spatio-temporal data and the set of eventualities may be associated with a particular region and a particular time period. The processor may be further configured to organize the set of eventualities to generate a document plan, and to generate a linguistic representation of the set of eventualities using the document plan.

Yet further embodiments may include a non-transitory computer readable storage medium comprising instructions for describing motion. The instructions, when executed by a processor, may configure the processor to receive a set of eventualities. The set of eventualities may describe at least one of a domain event and a domain state. The at least one of the domain event and the domain state may be derived from a set of spatio-temporal data and the set of eventualities may be associated with a particular region and a particular time period. The instructions may further configure the processor to organize the set of eventualities to generate a document plan, and to generate a linguistic representation of the set of eventualities using the document plan.

BRIEF DESCRIPTION OF THE DRAWINGS

Figure 1:
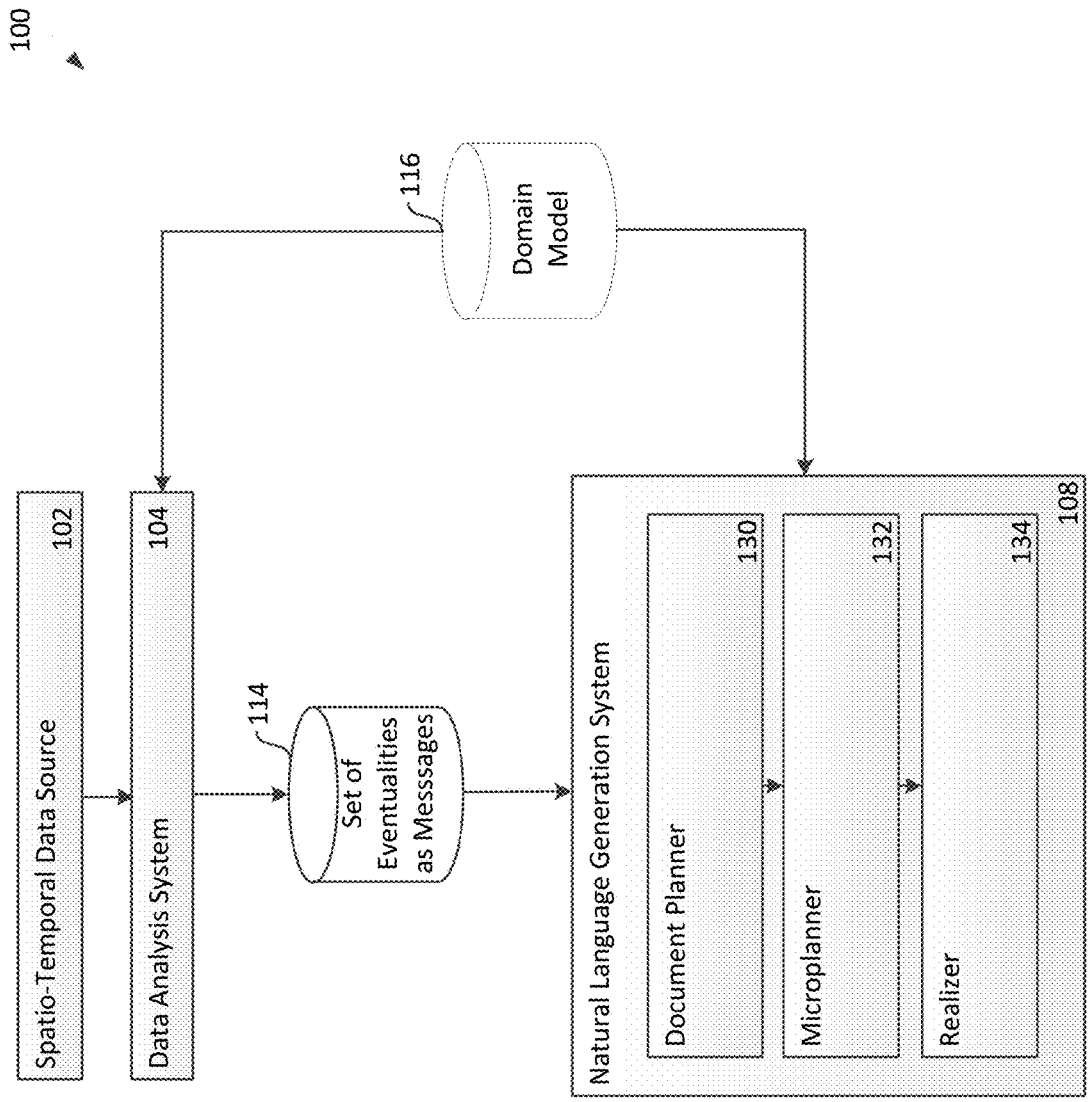
Figure 2:
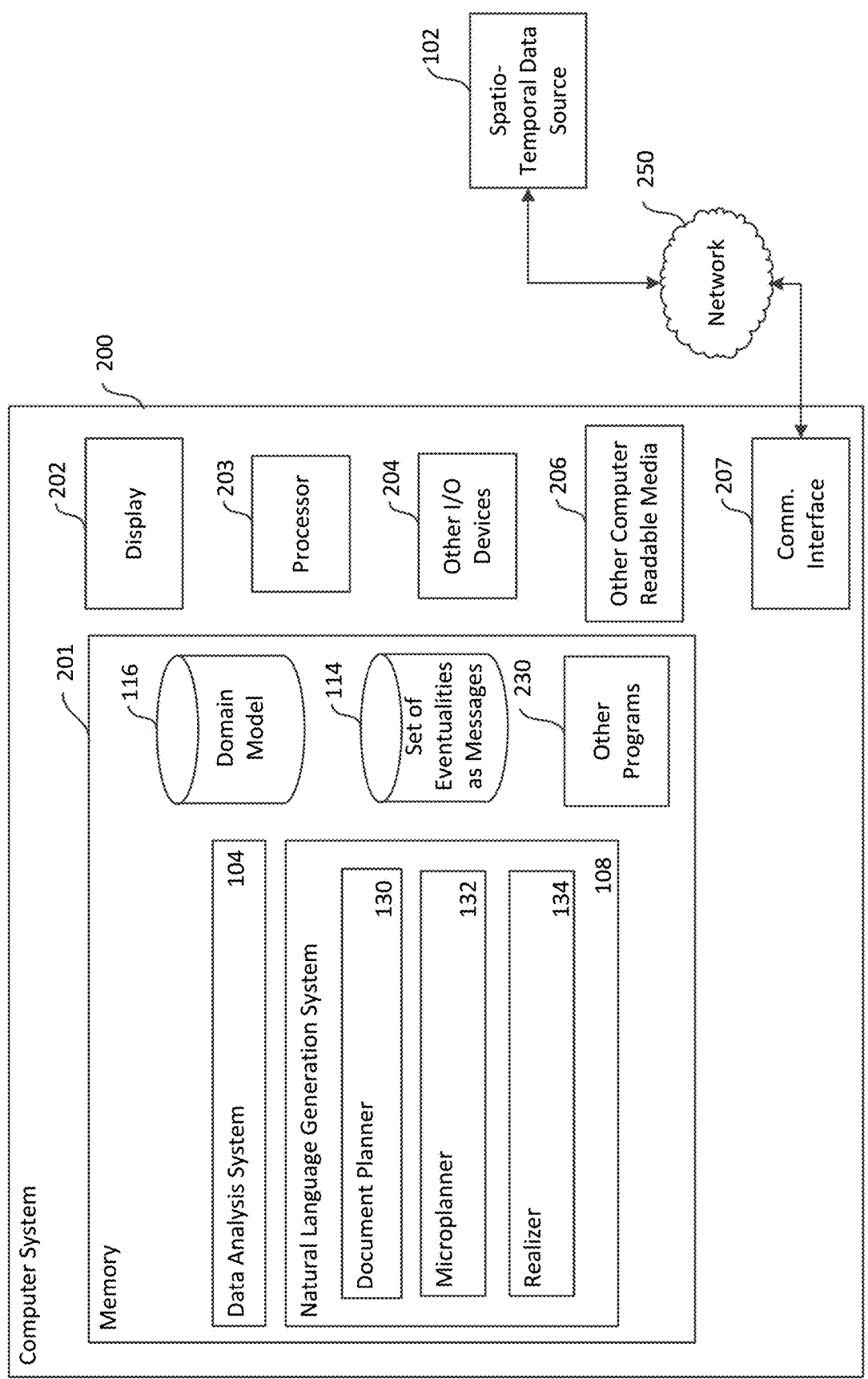
Figure 3:
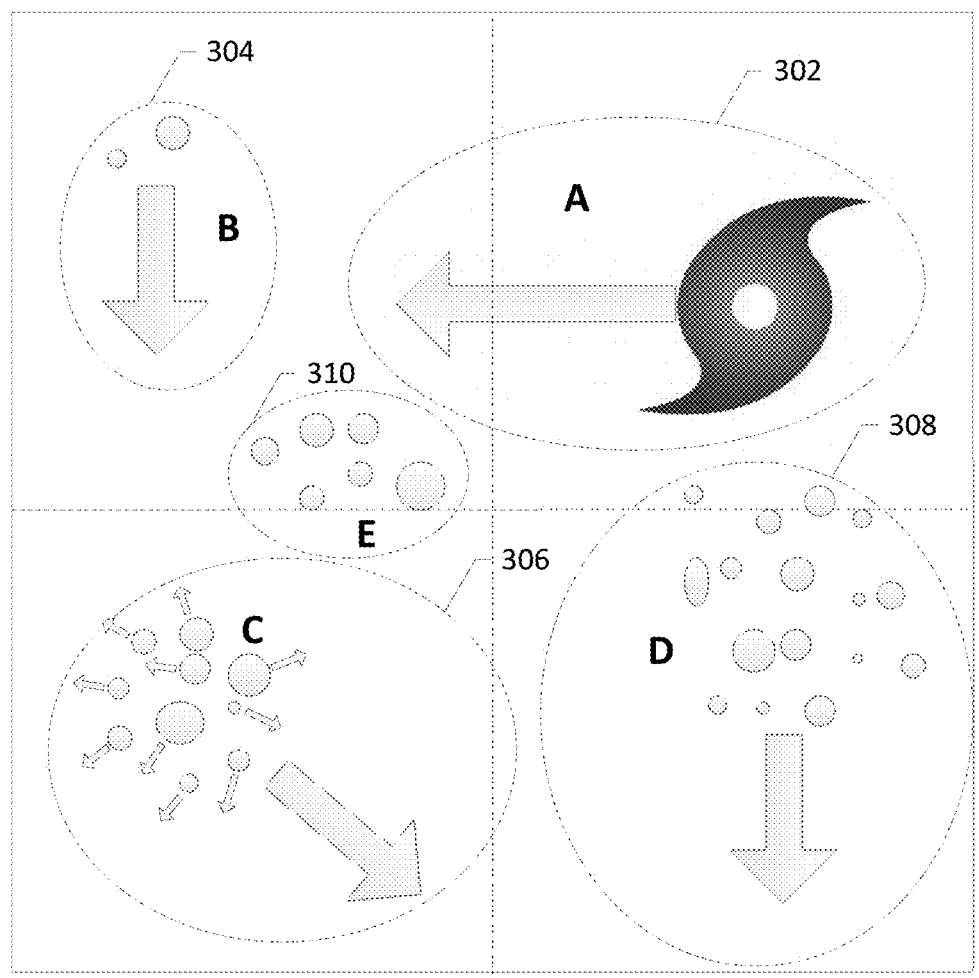
Figure 4:
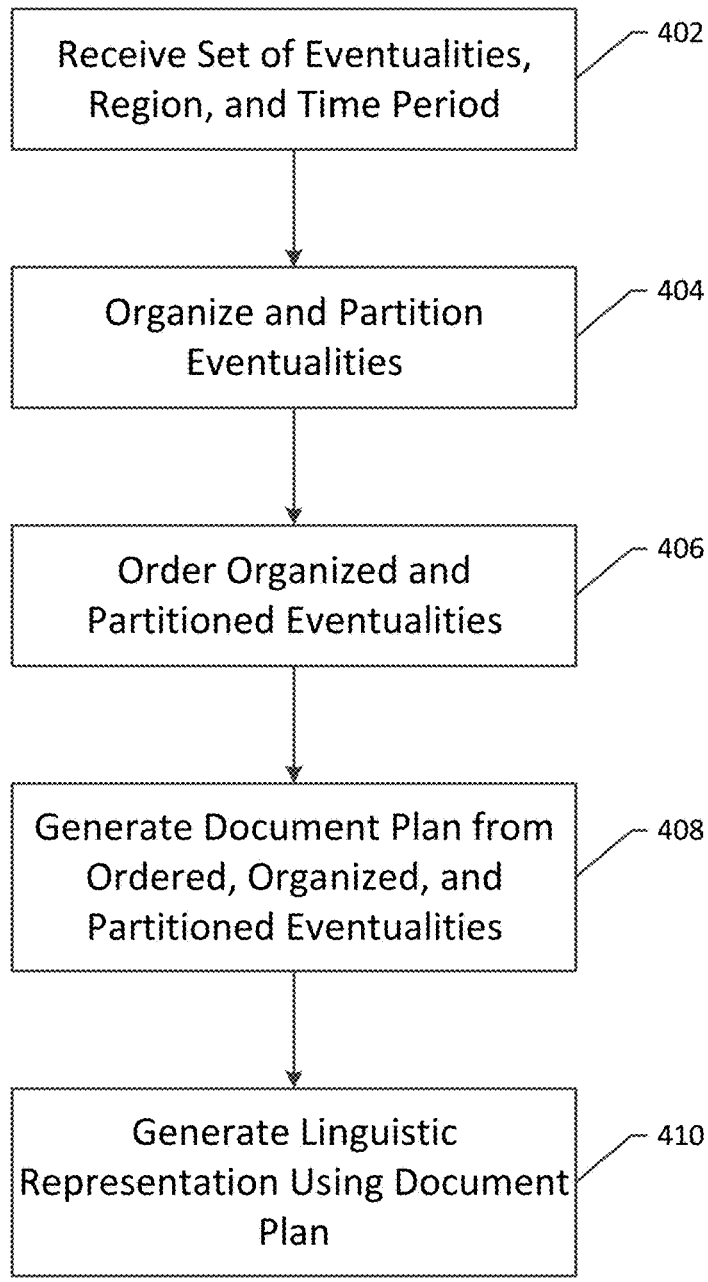
Figure 5:
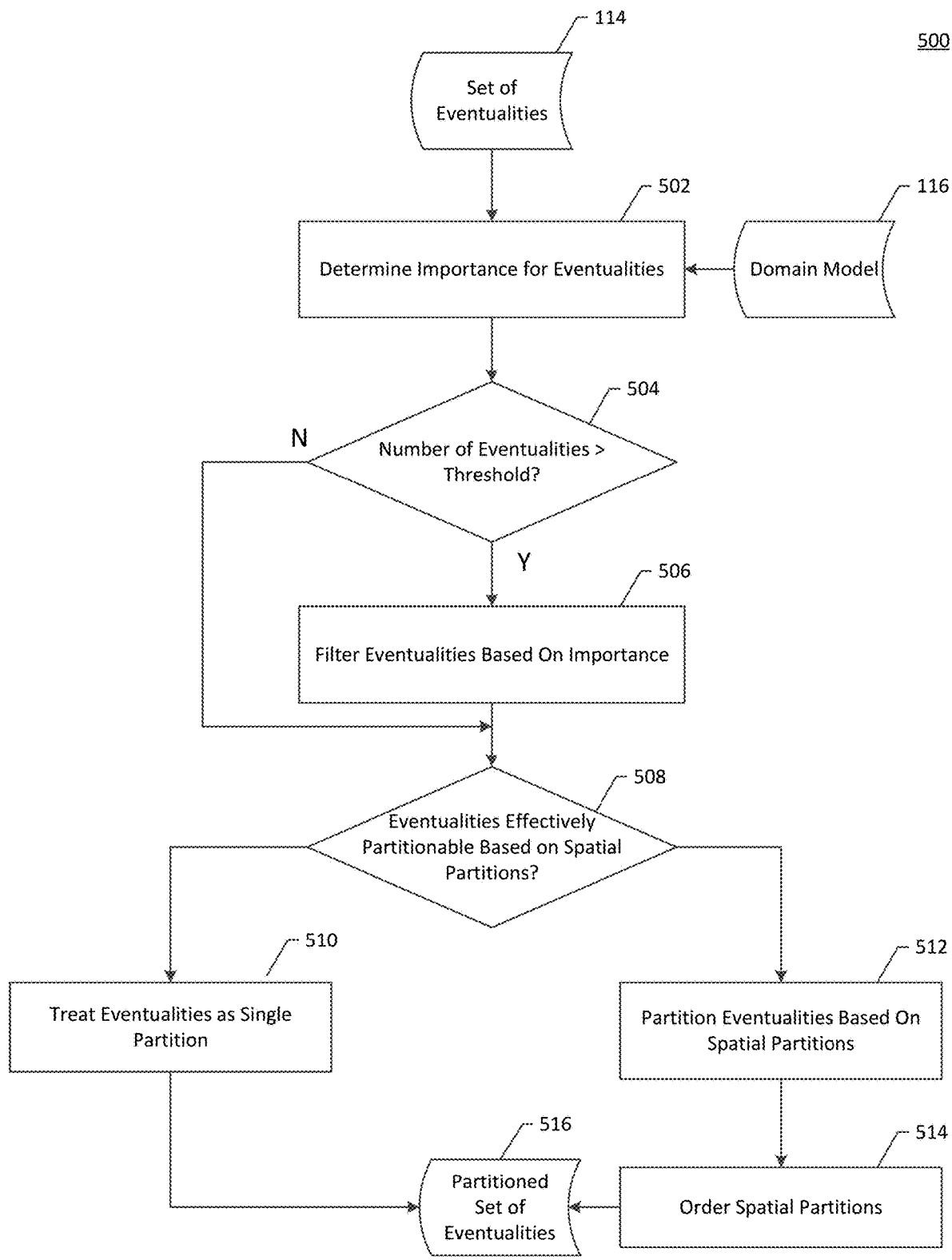
Figure 6:
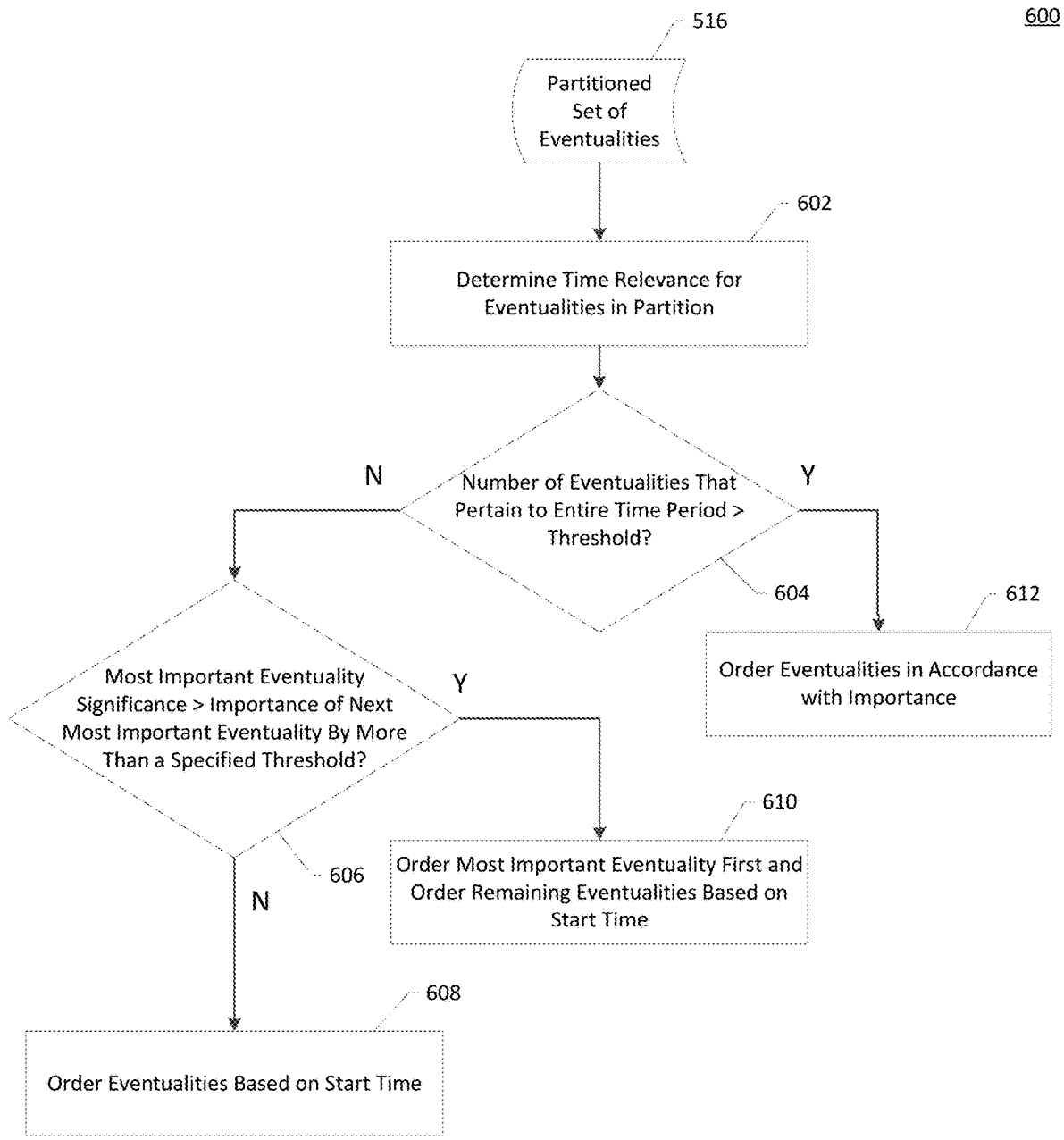

Having thus described embodiments of the invention in general terms, reference will now be made to the accompanying drawings, which are not necessarily drawn to scale, and wherein:

FIG. 1 is a schematic representation of an motion description system that may benefit from some example embodiments of the present invention;

FIG. 2 illustrates a block diagram of an apparatus that embodies a motion description system in accordance with some example embodiments of the present invention;

FIG. 3 depicts an illustration of a particular spatial region and corresponding eventualities in accordance with some example embodiments of the present invention; and FIGS. 4-6 are flowchart depictions of example methods that may be performed by a motion description system in accordance with some example embodiments of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

One of the primary factors that users generally consider in the analysis of spatio-temporal data is the concept of motion. The relative position of attributes of interest over time can help a user determine where the attributes of interest has been, where it is going, how fast it will get there, and other relevant data. From biology to chemistry to physics to meteorology, the movement of attributes of interest within a system can provide valuable information about the system and the attributes of interest within it.

Systems have been developed to detect motion from such sets of spatio-temporal data, and represent moving and static objects as a set of eventualities. The term "eventualities" in the present context is understood to relate to both motion events (e.g., an object moving in a particular direction at a particular speed) and non-motion states (e.g., an object that does not change in position over time). These eventualities may be provided to a system for the purpose of generating a linguistic representation of the data contained within the eventualities. For example, the eventualities may be derived from a set of spatio-temporal data as described in PCT Patent Application No. PCT/IB2012/057773, <(Motion Detection patent application)> which is incorporated by reference in its entirety herein.

Moving objects and static objects may be characterized as "domain events" and "domain states", respectively by attaching domain-specific cluster motion types (e.g., "spreading", "receding", or "a band of precipitation" for a weather domain, "gridlock", "stop-and-go", or "congested" for a traffic domain, or the like) to the respective object. Cluster motion types may be assigned to moving and static objects based on the cluster motion types of the motion vectors associated with the objects. Where the constituent motion vectors do not correspond to a simple domain event, the domain event may be classified as a "hybrid movement." In order to express computed domain events and states linguistically by an NLG system, the domain specific cluster motion types may be analyzed to ensure that the domain specific cluster motion types fit into a language friendly ontology of domain events and states. As such, the computed domain events and states may be identified as linguistically describable using words and phrases from the sublanguage used in a specific domain (e.g. a sublanguage for weather reports). This process is particularly relevant to the field of natural language generation, as other techniques for identifying the motion of objects are not concerned with linguistic expressions of said motion. For example, a robot may be fitted with a computer vision module to drive a vehicle in real-world traffic. Such a robot might compute motion events and states which may not be describable in language, as driving the vehicle is the objective of this robot, but describing the other moving vehicles in linguistic terms is not.

The set of eventualities may be associated with a particular domain. For example, types of motion and terminology used to describe said motion may differ based on the type of data and the associated subject matter. For example, terminology used to describe weather data may differ from terminology used to describe automobile traffic.

Upon analysis of the set of eventualities, embodiments of the invention may function to generate a set of text describing the motion of objects as described herein. These eventualities may be processed to develop a document plan that may be subsequently realized as a fluent and coherent text. For example, precipitation data associated with a geographic region may be analyzed to identify the movement of precipitation systems, and a weather forecast may be generated based on the movement information. Although example embodiments are described with respect to meteorological applications, the systems, apparatuses, methods, and computer products described herein could be equally applicable to analysis and text generation for any set of visual data.

FIG. 1 is an example block diagram of example components of an example motion description system 100. In some example embodiments, the motion description system 100 may comprise a data analysis system 104, and a natural language generation system 108. The data analysis system 104, and/or the natural language generation system 108 may take the form of, for example, a code module, a component, circuitry and/or the like. The components of the motion description system 100 are configured to provide various logic (e.g. code, instructions, functions, routines and/or the like) and/or services related to the motion description system.

In some example embodiments a spatio-temporal data source 102 is configured to provide a set of spatio-temporal data, such as from one or more sensors. For example, the spatio-temporal data source 102 may receive information that describes the position of one or more attributes of interest over time. The spatio-temporal data source 102 is operable to provide data that may be used by the data analysis system 104 to generate a set of eventualities represented as messages 114. Example types of spatio-temporal data provided by the spatio-temporal data source 102 may include weather data (e.g., weather sensors), traffic data (e.g., areas of automobile congestion on a street map), scientific data (e.g., growth of cells in a petri dish), medical data (e.g., analysis of an electrocardiograph wave form), or network data (e.g., a visual representation of bandwidth in a network).

The spatio-temporal data source 102 may in some example embodiments be in data communication with one or more sensors, monitoring systems, storage devices, computing nodes, and/or the like. In examples in which the spatio-temporal data source 102 is in communication with a monitoring system or a sensor, the spatio-temporal data source 102 may receive a set of spatial data provided in a visual format that includes one or more images. However, in some example embodiments, the methods, apparatus and computer products described herein may operate without a spatio-temporal data source 102.

The data analysis system 104 may be configured to receive input of raw data, such as raw data received via the spatio-temporal data source 102 and/or other data determined or otherwise obtained by the spatio-temporal data source 102 or the data analysis system 104. Alternatively or additionally, the data analysis system 104 may be configured to receive or input raw input data continuously or semi-continuously, such as via a data stream, and determine an importance of the raw input data (e.g., whether the data violates a constraint, satisfies a threshold and/or the like) in order to detect or otherwise determine the presence of a motion event or a change in spatial data. In other words, in some example embodiments, the data analysis system 104 may function as or otherwise embody the spatio-temporal data source 102.

Spatio-temporal data may include data such as, but not limited to, data that indicates variation across location (e.g. rainfall in different regions), or any data that combines both time series data and spatial data (e.g. rainfall across time in different geographical output areas). The data contained or otherwise made accessible by the spatio-temporal data source 102 may be provided in the form of numeric values (e.g., coordinate values) for specific parameters across time and space, but the raw input data may also contain alphanumeric symbols, such as the RDF notation used in the semantic web, or as the content of database fields. The data may be received from a plurality of sources and, as such, data received from each source, sub source or data that is otherwise related may be grouped into or otherwise referred to as the spatio-temporal data source 102.

The data analysis system 104 may identify motion of one or more objects in the set of spatial data provided by the spatio-temporal data source 102 to generate messages that summarize patterns of motion identified in the set of spatio-temporal data. These messages represent a set of eventualities represented as messages 114 that define a series of motion events and/or non-motion states which relate to the motion detected in the set of spatio-temporal data. As such, the output of the data analysis system 104 may be a set of eventualities represented as messages 114. However, it should be appreciated that the data analysis system 104 may also output a set of eventuality data in a format other than messages, and a later process may convert the set of eventuality data into a message format. An example representation of a set of eventualities is described below with respect to FIG. 3.

The set of eventualities represented as messages 114 may be generated for a particular domain, as defined by a domain model 116. As described above, the domain model 116 may be related to the type of data and/or the data desired to be derived from the spatio-temporal data (e.g., weather data, traffic data, network data, or biological data). The domain model 116 may include terms and data types related to detection and description of moving and static objects within the spatio-temporal data. The domain model 116 may include representations of several pieces of domain specific information or knowledge such as (but not limited to) meta data (e.g. expected ranges of data values, data types, thresholds for categorization of data), ontology (e.g. domain-specific motion types, categories for direction of motion, concepts, their relationships and properties, language friendly messages representing eventualities, relationships and inference rules that operate on messages) and a priori specified importance values of messages. For example, the domain model 116 may include a series of definitions and rules for assigning domain-relevant types to particular instances of detected moving and static objects. The domain model 116 may also include message definitions, rules for associating particular eventualities with particular message types, and rules for determining the relative importance of different eventualities. The domain model 116 may contain information related to a particular domain or industry. In some examples, the domain model 116 may provide importance levels, information related to particular behaviors and/or the like. In other examples, the domain model 116 may describe relationships between various events and/or phenomena. For example in a weather domain, a domain model may indicate or otherwise instantiate an extreme weather message in an instance in which wind speeds that are related to hurricane type events or temperatures that may cause harm to humans or other animals or may cause damage or interference to shipping are present in the data. The extreme weather message may then be labeled as important, whereas typical temperatures or a typical wind message may not be marked as important in some examples.

The set of eventualities represented as messages 114 may be used by the natural language generation system 108 to organize these messages into a document plan. In some examples, messages are language independent data structures that correspond to informational elements in a text and/or collect together underling data in such a way that the underlying data can be linguistically expressed. In some examples, messages are created based on a requirements analysis as to what is to be communicated for a particular scenario (e.g. for a particular domain). A message typically corresponds to a fact about the underlying data (for example, the existence of some observed event) that could be expressed via a simple sentence (although it may ultimately be realized by some other linguistic means such as a phrase or word). For example, to linguistically describe wind, a user may want to know a speed, a direction, a time period or the like, but also, the user wants to know changes in speed over time, warm or cold fronts, geographic areas and or the like. In some cases, users do not even want to know wind speed, they simply want an indication of a dangerous wind condition. Thus, a message related to wind speed may include fields to be populated by data related to the speed, direction, time period or the like, and may have other fields related to different time points, front information or the like. The mere fact that wind exists may be found in the data, but to linguistically describe "light wind" or "gusts" different data interpretation must be undertaken as is described herein. An example method for generation of natural language from a set of eventualities using a natural language generation system 108 is described further below with respect to FIG. 4.

In some example embodiments, a natural language generation system, such as natural language generation system 108, is configured to generate phrases, sentences, text or the like which may take the form of natural language text. The natural language generation system 108 comprises a document planner 130, a microplanner 132 and/or a realizer 134. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner 130 may be configured to create, filter, organize, and order one or more messages based on the set of set of eventualities represented as messages 114. The document planner 130 may be further configured to determine how to arrange those messages to describe the set of eventualities. The document planner 130 may comprise a content determination process that is configured to select the messages to provide a complete picture of the provided data. Returning to the weather example, a forecast may be generated that describes all weather features in a particular geographic region or according to a particular day of the week. Various other message orders may be employed based on the presence of absence of particular events. Example methods of generating a document plan from a set of eventualities are described below with respect to FIGS. 4-6.

The output of the document planner 130 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast and/or the like) to each other.

The microplanner 132 may be configured to modify the document plan from the document planner 130, such that the document plan may be expressed in natural language. In some example embodiments, the microplanner 132 may perform aggregation, lexicalization and referring expression generation. In some examples, aggregation includes, but is not limited to, determining whether two or more messages can be combined together linguistically to produce a more complex sentence. For example, one or more key events may be aggregated so that both of the events can be described by a single sentence.

In some examples, lexicalization includes, but is not limited to, choosing particular words for the expression of concepts and relations. For example, the phrase "it will become mainly cloudy across the west" may be used to describe cloud cover moving into the western sky.

In some examples, referring expression generation includes, but is not limited to, choosing how to refer to an entity so that it can be unambiguously identified by the reader. For example, in a first sentence "rain" and a location may be referenced where "the showers" or "the overcast weather" may be referenced in subsequent sentences.

The output of the microplanner 132, in some example embodiments, is a tree-structured realization specification whose leaf-nodes are ontological properties derived from the data analysis system 104, and whose internal nodes express rhetorical relations between the leaf nodes. A phrase specification may correspond to a sentence or a sub-sentence fragment (e.g. a title) and are produced from one or more messages. A phrase specification is configured to contain one or more syntactic constituents (e.g. subject, verb, prepositional phrase and/or the like) and one or more syntactic features (e.g. tense).

A realizer 134 may be configured to traverse a text specification output by the microplanner 132 to express the text specification in natural language. The realization process that is applied to each phrase specification in the text specification makes use of a grammar (e.g. the grammar of the linguistic resources 114) which specifies the valid syntactic constituents in the language and further provides a way of mapping from phrase specifications into the corresponding natural language sentences. The output of the process is, in some example embodiments, a well-formed natural language text. In some examples, the natural language text may include embedded mark-up. The output of the realizer 134, in some example embodiments, is a description of the objects and the motion of the objects, or other data that may be derived from the motion information used to build the ontological properties. The realizer may also output text or a narrative that is configured to describe or otherwise summarize the motion of the objects, and/or one or more events associated with the motion of the objects.

FIG. 2 is an example block diagram of an example computing device for practicing embodiments of an example motion description system. In particular, FIG. 2 shows a computing system 200 that may be utilized to implement a motion description system 100 having a spatio-temporal data source 102; a data analysis system 104, a natural language generation system 108 including, in some examples, a document planner 130, a microplanner 132 and/or a realizer 134, and/or an optional user interface (not shown). One or more general purpose or special purpose computing systems/devices may be used to implement the data analysis system 104, and/or the natural language generation system 108. In addition, the computing system 200 may comprise one or more distinct computing systems/devices and may span distributed locations. In some example embodiments, the data analysis system 104, and/or the natural language generation system 108 may be configured to operate remotely via the network 250. In some example embodiments, a pre-processing module or other module that requires heavy computational load may be configured to perform that computational load and thus may be on a remote device or server. For example, the data analysis system 104 may be accessed remotely. Furthermore, each block shown may represent one or more such blocks as appropriate to a specific example embodiment. In some cases one or more of the blocks may be combined with other blocks. Also, the data analysis system 104, and/or the natural language generation system 108 may be implemented in software, hardware, firmware, or in some combination to achieve the capabilities described herein.

In the example embodiment shown, computing system 200 comprises a computer memory ("memory") 201, a display 202, one or more processors 203, input/output devices 204 (e.g., keyboard, mouse, CRT or LCD display, touch screen, gesture sensing device and/or the like), other computer-readable media 205, and communications interface 206. The processor 203 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 2 as a single processor, in some embodiments the processor 203 comprises a plurality of processors. The plurality of processors may be in operative communication with each other and may be collectively configured to perform one or more functionalities of the motion description system as described herein.

The data analysis system 104, and/or the natural language generation system 108 are shown residing in memory 201. The memory 201 may comprise, for example, transitory and/or non-transitory memory, such as volatile memory, non-volatile memory, or some combination thereof. Although illustrated in FIG. 2 as a single memory, the memory 201 may comprise a plurality of memories. The plurality of memories may be embodied on a single computing device or may be distributed across a plurality of computing devices collectively configured to function as the motion description system. In various example embodiments, the memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the data analysis system 104, and/or the natural language generation system 108 may be stored on and/or transmitted over the other computer-readable media 205. The components of the data analysis system 104, and/or the natural language generation system 108 preferably execute on one or more processors 203 and are configured to generate natural language describing motion vectors derived from spatial data, as described herein.

Alternatively or additionally, other code or programs 230 (e.g., an administrative interface, a Web server, and the like) and potentially other data repositories also reside in the memory 201, and preferably execute on one or more processors 203. Of note, one or more of the components in FIG. 2 may not be present in any specific implementation. For example, some embodiments may not provide other computer readable media 205 or a display 202.

The data analysis system 104, and/or the natural language generation system 108 are further configured to provide functions such as those described with reference to FIG. 1. The data analysis system 104, and/or the natural language generation system 108 may interact with the network 250, via the communications interface 206, with the spatio-temporal data source(s) 102, (e.g. remote reference data, remote performance data, remote aggregation data, remote sensors and/or the like), third-party content providers 254 and/or client devices 258. The network 250 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 250 may take the form of the internet or may be embodied by a cellular network such as an LTE based network. In this regard, the communications interface 206 may be capable of operating with one or more air interface standards, communication protocols, modulation types, access types, and/or the like. The client devices 258 include desktop computing systems, notebook computers, mobile phones, smart phones, personal digital assistants, tablets and/or the like.

In an example embodiment, components/modules of the data analysis system 104, and/or the natural language generation system 108 are implemented using standard programming techniques. For example, the data analysis system 104 and/or the natural language generation system 108 may be implemented as a "native" executable running on the processor 203, along with one or more static or dynamic libraries. In other embodiments, the data analysis system 104, and/or the natural language generation system 108 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the data analysis system 104, and/or the natural language generation system 108, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. The domain model 114 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the spatio-temporal data source 102, the data analysis system 104, and/or the natural language generation system 108 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIG. 3 depicts an illustration of a particular spatial region 300 and corresponding eventualities A 302, B 304, C 306, D 308, and E 310 in accordance with some example embodiments of the present invention. The spatial region 300 and corresponding eventualities 302-310 provide a visual representation of data contained within a set of eventualities, such as the set of set of eventualities represented as messages 114 described with respect to FIGS. 1 and 2. For example, although the eventualities are depicted in a visual manner with respect to FIG. 3, these eventualities may represent a data output from a process for detecting motion in a set of spatio-temporal data. As a specific example, motion events (e.g., a moving object) and motion states (e.g., a static object) may be depicted as entries in a table, as data vectors, or in any other format which describes motion as derived from a set of spatio-temporal data.

The region 300 depicts a series of weather events throughout the region. As described above, although weather systems are used as an example, the same and similar methods as described herein may be applied to other domains. In the instant example, eventuality A 302 represents a hurricane system moving in a westerly direction across the region. Eventuality B 304 represents a small weather system (e.g., rain, snow, sleet, or other precipitation) traveling in a southerly direction. Eventuality C 306 represents a spreading weather system traveling in a southeasterly direction. Eventuality D 308 represents a large weather system traveling in a southerly direction. Eventuality E 310 represents a stationary weather system.

As an example, a data or message structure defining the eventualities 302-310 might be provided according to the following format:

TABLE 1

| Identifier | Direction | Speed | Domain Parameter Type | Location | Motion Type | Duration |
|---|---|---|---|---|---|---|
| A | W | 125 kph | Hurricane | x1, y1, z1 | Basic Motion | 0:00-23:59 |
| B | S | 5 kph | Rain | x2, y2, z2 | Basic Motion | 0:00-11:00 |
| C | SE | 10 kph | Rain | x3, y3, z3 | Spreading | 4:00-8:53 |
| D | S | 15 kph | Sleet | x4, y4, z4 | Basic Motion | 3:00-18:45 |
| E | Stationary | 0 kph | Hail | x5, y5, z5 | N/A | 0:00-19:00 |

The identifier field may provide a unique identifier to each eventuality. The direction field may identify a direction of motion for the eventuality. The speed field may identify a speed of motion. The domain parameter type field may identify a type of eventuality. The location may identify a location of the eventuality in the region, and the motion type field may identify motion type (e.g., in the present example, the fact that eventuality C 306 is characterized as "spreading" due to the individual motion vectors of the component elements of the eventuality appearing to be directed away from a central location). The duration field may identify the time period in which the eventuality exists, or the time period in which the eventuality is active (e.g., moving). Some or all of these fields may be derived from the set of spatio-temporal data, though certain fields (e.g., a type field) may be derived from other data.

The eventualities may be partitioned into one or more partitions based on various factors, such as locations, type of motion, type of eventuality, direction of motion, or the like. In the instant example, the region 300 is divided into four partitions representing different geographical areas of the region. Each of the eventualities may be assigned to at least one partition. These partitions may be used to develop a document plan describing the eventualities. For example, the document plan may describe eventualities with respect to particular partitions. An example method for describing eventualities based on a partition is provided below with respect to FIG. 5.

FIGS. 4-6 illustrate example flowcharts of the operations performed by an apparatus, such as computing system 200 of FIG. 2, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 201 of an apparatus employing an embodiment of the present invention and executed by a processor 203 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4-6, when executed, convert a computer or processing circuitry into a particular machine configured to perform an example embodiment of the present invention. Accordingly, the operations of FIGS. 4-6 define an algorithm for configuring a computer or processor, to perform an example embodiment. In some cases, a general purpose computer may be provided with an instance of the processor which performs the algorithms of FIGS. 4-6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

FIG. 4 is a flow chart depicting a method 400 for generating natural language using an input set of eventualities. The method 400 is operable to receive a set of eventualities, a region, and a particular time period. The method 400 may process these inputs to generate a document plan, and use the document plan to generate a linguistic representation of the set of eventualities. For example, the method 400 may receive an input set of data describing one or more weather systems and motion of the weather systems, a geographical region where the weather systems are located, and a time period during which the weather systems were present, and the method 400 may generate a weather forecast from this data.

At action 402, the set of eventualities, the region, and the time period are received by the method 400. In the present context, the term "region" may apply to any set of location based data associated with the set of eventualities, not just a particular geographic region. For example, in the case of weather data, the region may be a geographic region of a city, county, country, or the like, but in the case of traffic data the region may be associated with a particular road or roads, in the case of network traffic the region may be associated with a particular set of nodes of the network, or in the case of medical data the region may be associated with a particular part of a patient's body. The eventualities, region, and time period may relate to a set of spatio-temporal data received and processed by a motion description system. As an example, a set of eventualities may provide data about one or more weather systems and corresponding motion, the region may be a geographical region, and the particular time period may be a time of day associated with a set of spatio-temporal data from which the eventualities were derived.

At action 404, the eventualities are organized and/or partitioned. Partitioning and/or organizing of the eventualities in this manner may provide for efficient description of the region of interest by grouping eventualities according to common characteristics that make for easy description. For example, weather events that occur in a particular part of the region may be grouped together for description or analysis. An example of a method for organizing and/or partitioning eventualities is described further below with respect to FIG. 5.

At action 406, the organized and/or partitioned eventualities are placed in a particular order. The eventualities may be ordered based on various factors, including but not limited to the type of eventuality, the partition into which the eventuality has been placed, or the importance of the eventuality as determined based on rules included in a domain model 116. An example of a method for ordering the eventualities is described further below with respect to FIG. 6.

At action 408, a document plan is generated using the organized, partitioned, and/or ordered eventualities. Once the eventualities are grouped and ordered, a structure may be formed for generation of one or more messages to describe the set of eventualities. For example, rules for establishing messages may be applied based on a domain model 116 to convert the organized, partitioned, and/or ordered eventualities into messages. The structure of the eventualities may be used to link the messages together into a hierarchical structure that is usable by a natural language generation system or a component thereof (e.g., a microplanner such as the microplanner 132) to generate natural language from the messages (e.g., by populating the document plan with information contained within the domain model and/or set of eventualities).

At action 410, a linguistic representation is generated using the document plan. As described above with respect to FIG. 1, the document plan generated at action 408 may be populated with data according to the structure of the document plan and message types defined by the set of eventualities and/or domain model. The method 400 may employ a natural language generation system such as the natural language generation system 108 described with respect to FIG. 1 to generate said linguistic representation using the document plan.

FIG. 5 is a flow chart depicting an example of a method 500 for organization and/or partitioning a set of eventualities in accordance with example embodiments of the present invention. In order to efficiently describe the set of eventualities, embodiments of the invention may organize particular eventualities based on quantity and importance. For example, if a given set of eventualities has hundreds of individual eventualities, it may not be practical to generate a set of text that describes each eventuality in detail. As such, a method such as the method 500 may be employed to organize, partition, and/or filter the eventualities to provide a concise, efficient set of eventualities for generation of the linguistic representation as described with respect to FIG. 4.

At action 502, a set of eventualities represented as messages 114 is provided as input, and importance values are determined for the eventualities. The term "importance" is intended as a general term to describe analysis of the set of data to identify relevant eventualities for processing by further steps of the natural language generation process. Individual eventualities or groups of eventualities may be given a particular score to rate how important description of that particular eventuality or group of eventualities is to understanding of the set of eventualities as a whole. These importance scores may be derived according to a domain model, such as the domain model 116. The importance of an eventuality may be calculated using an externally specified importance value (e.g., an a priori importance value) for the eventuality type (e.g., an importance value for a particular type of weather system), multiplied by a number of spatial points in the eventuality, multiplied by the time period of the eventuality. In some embodiments, different features of the eventuality may be accorded different weights. As an example of different relative importance values, in a weather domain, certain eventualities or eventuality types (e.g., a tornado or hurricane) may be deemed as more important than other eventualities (e.g., a single cloud), or a weather system that is larger, denser, or with a greater precipitation value may assigned a higher importance value than a smaller, more dispersed, or lighter precipitation system. As another example, in the traffic domain, a car accident on a highway may be assigned a higher importance than free-flowing traffic on a back road.

At action 504, a determination is made as to whether the number of eventualities is greater than some threshold number. It may only be practical to describe a certain number of eventualities based on limitations in text output length, processor availability, or the like. As such, the method 500 may employ methods of filtering the eventualities if these are greater than some threshold number of eventualities. This threshold may be defined as a particular constant value (e.g., no more than 50 eventualities), or the number may be dynamic based on particular characteristics of the domain model and/or the set of eventualities.

At action 506, if the number of eventualities is greater than the threshold, then one or more eventualities may be filtered out. The filtering process may include dropping these eventualities entirely, or aggregating filtered eventualities and providing less detail or an aggregate description of the filtered eventualities. Eventualities may be filtered based on various criteria, including but not limited to importance, ease of aggregation, or the like. As an example, the least important eventualities may be filtered from a set of eventualities that contains greater than the threshold number of eventualities, until the set of eventualities contains less than the threshold number. As a specific example, returning to FIG. 3, the eventuality B 304 might be filtered out due to its smaller size (and thus likely lower importance score) than the other eventualities present in the region, while the eventuality A 302 might be assigned a very high importance score due to the fact that hurricanes are dangerous weather systems that are highly relevant to a weather forecast.

At action 508, a determination is made as to whether the eventualities can be effectively partitioned according to a partitioning method. As described above, the partitioning may be performed in a spatial manner, such that eventualities located in similar locations are partitioned together for description, although other partitioning methods might also be employed (e.g., by type, size, importance, etc.). Spatial portioning may be employed such that all eventualities in a particular part of the region (e.g., northern area or southern area) are grouped together. If such a partitioning is possible, the eventualities are partitioned at action 512. Otherwise, the eventualities may be treated as a single partition at action 510.

After the eventualities are partitioned at action 512, these partitioned may be ordered in a particular way at action 514. The partitions may be ordered to enhance coherence. For example, if the partitions are spatially divided into series of partitions associated with different cardinal directions (e.g., a northeastern partition, a southeastern partition, a southwestern partition, and a northwestern partition such as depicted in FIG. 3), then a clockwise or counterclockwise ordering may improve coherence when describing the eventualities. The end result of the method 500 may be a partitioned set of eventualities 516, even if said partitioned set only includes a single partition.

FIG. 6 is a flow chart depicting an example of a method 600 for ordering eventualities as part of generating a document plan for a set of eventualities according to example embodiments of the present invention. In addition to organizing and partitioning the eventualities into groups, generation of a document plan may also include determining an appropriate order in which the eventualities (and thus eventually messages associated with said eventualities) will appear. This ordering process may be employed to present eventualities in a logical, efficient order. It should be appreciated that the method 600 only describes one example embodiment for ordering of eventualities, and that additional or alternative methods and criteria could be employed for determining an order of a set of eventualities within a document plan.

At action 602, the partitioned set of eventualities 516 is received as an input and time relevance is determined for each eventuality in a particular partition. Although the method 600 is not shown as looping through each partition in the figure, it should be appreciated that partitions may be processed one at a time or as a group, with the method being employed to order the eventualities within each partition, and the partitions themselves based on various factors.

As described above with respect to FIG. 3, each eventuality may be associated with a time value or range. These time values or ranges may define the temporal period of the spatio-temporal data for which the eventuality is relevant, such as when the eventuality is present or in motion. These time values may be examined for the purposes of ordering the eventualities. For example, at action 604, a determination is made as to whether a particular proportion of the eventualities (e.g., greater than 75% of all eventualities in the particular partition) apply to an entire time period, or at least a certain portion of the entire time period. If greater than the threshold proportion of eventualities within the partition apply to the entire time period, the method 600 may proceed to action 612, where these eventualities are ordered in accordance with their importance. Otherwise, the method 600 proceeds to action 606.

At action 606, a determination is made as to whether the difference in importance between the most important eventuality and the next most important eventuality is greater than a threshold value. In other words, if a particular eventuality is so much more important than other eventualities in the particular partition, then it may be appropriate to indicate that the most important eventuality should be described first. If this is the case, the method 600 proceeds to action 610. Otherwise, the method 600 proceeds to action 608.

At action 608, eventualities may be ordered based on their start time, ensuring that eventualities are described in chronological order. Otherwise, if the method 600 proceeded to action 610, the most important eventuality may be described first, regardless of time, and the remaining eventualities may be ordered based on their respective start time.

Although action 610 describes only a single most important event being described out of chronological order, it should be appreciated that other important events (e.g., events that are greater than a particular number of standard deviations of importance than other events in the set of eventualities) could also be described out of chronological order. The end result of the method 600 is a set of ordered eventualities, which may be used to generate a document plan, such as described above with respect to FIG. 4.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus configured to transform an input data stream comprising spatio-temporal data that is expressed at least in part in a non-linguistic format into a format that can be expressed at least in part via a linguistic representation in a textual output, the apparatus comprising a memory coupled to at least one processor and the at least one processor, the apparatus configured to:
   receive the input data stream comprising a spatio-temporal data set, the spatio-temporal data set comprising the spatio-temporal data and associated with a particular region and a particular time period;
   organize the spatio-temporal data set according to a domain model comprising an importance rules set for one or more spatio-temporal data subsets of the spatio-temporal data set;
   wherein organizing the spatio-temporal data set comprises:
      determining an importance score for one or more spatio-temporal data subsets of the spatio-temporal data set using the domain model, wherein the importance score is determined based on one or more of an externally specified importance value for an spatio-temporal data subset type, a number of spatial points in the spatio-temporal data subset, and a time period of the spatio-temporal data subset; and
      organizing the spatio-temporal data set according to the importance scores; and
   generate a document plan using the organized spatio-temporal data set, the document plan generated with one or more messages that describe each spatio-temporal data subset of the organized spatio-temporal data set; and
   generate a linguistic representation of the one or more messages using the document plan, wherein the linguistic representation of the one or more messages is displayable via a user interface.

2. The apparatus of claim 1, wherein a spatio-temporal data subset describes at least one of a domain event and a domain state.

3. The apparatus of claim 1, further configured to:
   filter out one or more spatio-temporal data subsets;
   partition one or more spatio-temporal data subsets into a portion of the particular region; and
   ordering the spatio-temporal data set into a particular order.

4. The apparatus of claim 1, wherein the particular region is a geographic region.

5. The apparatus of claim 1, further configured to:
   organize the spatio-temporal data set based on the importance scores by placing a most important spatio-temporal data subset first in the document plan.

6. The apparatus of claim 5, wherein the most important spatio-temporal data subset is placed first in the document plan in response to determining that a difference in an importance score between the most important spatio-temporal data subset's importance score and a next most important spatio-temporal data subset's importance score is greater than a threshold importance score value.

7. The apparatus of claim 1, wherein a domain of the spatio-temporal data set is at least one of weather data, traffic data, medical data, scientific data, and computer network data.

8. The apparatus of claim 1, wherein organizing the spatio-temporal data set further comprises ordering the spatio-temporal data set based on a start time of the one or more spatio-temporal data subsets.

9. The apparatus of claim 1, further configured to generate the linguistic representation by:
   generating a set of messages from the organized spatio-temporal data set; and
   conducting document planning, microplanning, and realization using the set of messages and the document plan to result in an output text.

10. A non-transitory computer readable storage medium configured to transform an input data stream comprising spatio-temporal data that is expressed at least in part in a non-linguistic format into a format that can be expressed at least in part via a linguistic representation in a textual output, the non-transitory computer readable storage medium comprising instructions, that, when executed by a processor, configure the processor to:
   receive the input data stream comprising a spatio-temporal data set, the spatio-temporal data set comprising the spatio-temporal data and associated with a particular region and a particular time period;
   organize the spatio-temporal data set according to a domain model comprising an importance rules set for one or more spatio-temporal data subsets of the spatio-temporal data set;
   wherein organizing the spatio-temporal data set comprises:
      determining an importance score for one or more spatio-temporal data subsets of the spatio-temporal data set using the domain model, wherein the importance score is determined based on one or more of an externally specified importance value for an spatio-temporal data subset type, a number of spatial points in the spatio-temporal data subset, and a time period of the spatio-temporal data subset; and
      organizing the spatio-temporal data set according to the importance scores; and
   generate a document plan using the organized spatio-temporal data set, the document plan generated with one or more messages that described each spatio-temporal data subset of the organized spatio-temporal data set; and generate a linguistic representation of the one or more messages using the document plan wherein the linguistic representation of the one or more messages is displayable via a user interface.

11. The non-transitory computer readable storage medium of claim 10, wherein a spatio-temporal data subset describes at least one of a domain event and a domain state.

12. The non-transitory computer readable storage medium of claim 10, comprising instructions, that, when executed by a processor, further configure the processor to:
   filter out one or more spatio-temporal data subsets;
   partition one or more spatio-temporal data subsets into a portion of the particular region; and
   ordering the spatio-temporal data set into a particular order.

13. The non-transitory computer readable storage medium of claim 10, wherein the particular region is a geographic region.

14. The non-transitory computer readable storage medium of claim 10, comprising instructions, that, when executed by a processor, further configure the processor to:
   organize the spatio-temporal data set based on the importance scores by placing a most important spatio-temporal data subset first in the document plan.

15. The non-transitory computer readable storage medium of claim 14, wherein the most important spatio-temporal data subset is placed first in the document plan in response to determining that a difference in an importance score between the most important spatio-temporal data subset's importance score and a next most important spatio-temporal data subset's importance score is greater than a threshold importance score value.

16. The non-transitory computer readable storage medium of claim 10, wherein a domain of the spatio-temporal data set is at least one of weather data, traffic data, medical data, scientific data, and computer network data.

17. The non-transitory computer readable storage medium of claim 10, wherein organizing the spatio-temporal data set further comprises ordering the spatio-temporal data set based on a start time of the one or more spatio-temporal data subsets.

18. The non-transitory computer readable storage medium of claim 10, comprising instructions, that, when executed by a processor, further configure the processor to generate the linguistic representation by:
   generating a set of messages from the organized spatio-temporal data set; and
   conducting document planning, microplanning, and realization using the set of messages and the document plan to result in an output text.

19. A computer-implemented method for transforming an input data stream comprising spatio-temporal data that is expressed at least in part in a non-linguistic format into a format that can be expressed at least in part via a linguistic representation in a textual output, the method comprising:
   receiving, by a processor, the input data stream comprising a spatio-temporal data set, the spatio-temporal data set comprising the spatio-temporal data and associated with a particular region and a particular time period;
   organizing, by the processor, the spatio-temporal data set according to a domain model comprising an importance rules set for one or more spatio-temporal data subsets of the spatio-temporal data set;
   wherein organizing the spatio-temporal data set comprises:
      determining, by the processor, an importance score for one or more spatio-temporal data subsets of the spatio-temporal data set using the domain model, wherein the importance score is determined based on one or more of an externally specified importance value for an spatio-temporal data subset type, a number of spatial points in the spatio-temporal data subset, and a time period of the spatio-temporal data subset; and
      organizing, by the processor, the spatio-temporal data set according to the importance scores; and
   generating, by the processor, a document plan using the organized spatio-temporal data set, the document plan generated with one or more messages that describe each spatio-temporal data subset of the organized spatio-temporal data set; and
   generate a linguistic representation of the one or more messages using the document plan, wherein the linguistic representation of the one or more messages is displayable via a user interface.

* * * * *